3,457,350
METHOD OF TREATING ASTHMA
Mario Salazar Mallen, Mexico City, Mexico, assignor to American Cyanamid Company, Stamford, Conn., a corporation of Maine
No Drawing. Filed Oct. 26, 1966, Ser. No. 589,485
Int. Cl. A61k 27/00
U.S. Cl. 424—250                        5 Claims

ABSTRACT OF THE DISCLOSURE

This invention relates to a method of treating asthma with N,N-diethyl-4-methyl-1-piperazinecarboxamide or a non-toxic acid addition salt.

---

This invention relates to methods of using compositions containing N,N-diethyl-4-methyl-1-piperazinecarboxamide or a non-toxic acid addition salt thereof as an active ingredient and a pharmaceutically acceptable carrier in treatment of disease.

The compound N,N-diethyl-4-methyl-1-piperazine-carboxamide is described in U.S. Patent 2,467,895, and is commonly referred to as diethylcarbamazine. The utility disclosed in that patent is the treatment of filariasis and in veterinary practice the treatment of ascarids in dogs.

It is surprisingly unexpected to discover now that diethylcarbamazine and its acid addition salts are highly active in the relief of asthma and asthmatic syndromes.

The compound N,N-ethyl-4-methyl-1-piperzinecarbox-amide as the free base, is a colorless low melting (47–49° C.) solid, sparingly soluble in water, but soluble in most of the common organic solvents. The compound forms the usual acid addition salts such as the hydrochloride, citrate (dihydrogen citrate), tartrate, maleate, etc., which, in general, are white crystalline solids, freely soluble in water.

It is expected that for convenience pharmaceutical compositions or dosage unit forms of N,N-diethyl-4-methyl-1-piperazinecarboxamide will be prepared from its acid addition salts, particularly the dihydrogen citrate salt, although the free base or other salts might be used if desired or if a particular use should warrant it. N,N-diethyl-4-methyl-1-piperazinecarboxamide or one of its salts may be combined with a carrier and administered in any of the usual pharmaceutical forms.

Asthma in man is a complex disease whose cause or causes are not fully understood. The physiological manifestations of this disease are quite varied and often severe. While clinical control of mild asthma may be temporarily achieved by administration of the usual bronchodilators (ephedrine, epinephrine, aminophylline, and the like) the side effects of such agents are generally considered undesirable and limit their use. In severe asthma the bronchodilators are medically unsatisfactory. Even such potent therapeutic agents as glucocorticoids do not give satisfactory control of severe asthma and likewise have undesirable side effects.

It is indeed surprisingly unexpected to discover that diethylcarbamazine in the form of its base or its acid addition salts is highly active in the relief of asthma and asthmatic syndromes in man. It is even active in relieving severe asthma of long standing in which bronchodilators have little or not effect and in which even glucocorticoid therapy has not been completely satisfactory.

The biological mechanism or mechanisms by which diethylcarbamazine and its salts achieve this effect in such a complex disease as asthma are not understood but appear to be quite unrelated to those associated with the anti-filarial activity of diethylcarbamazine.

In the treatment of asthma with diethylcarbamazine or its salts, it was found that from 1–15 mg. per kilogram per day is effective. The preferred range is from about 2 to about 10 mg. per kilogram per day. It is desirable to use higher dose levels at the beginning of treatment which can be considerably lowered for further treatment or maintenance.

The diethylcarbamazine may be administered as scored or unscored tablets, hard or soft shell capsules, oral or parenteral solutions or suspensions or syrups, or any other pharmaceutical form desired.

Tablets may include, in addition to the active ingredient, any of the following excipients: a binder such as acacia, corn starch, gelatin or the like. A disintegrating agent such as corn starch, potato starch, alginic acid, or the like. A lubricant such as stearic acid, magnesium stearate, talc, or the like. A sweetening agent such as saccharin or sucaryl. A flavoring such as peppermint oil, oil of wintergreen, or orange or cherry flavoring, or the like. A dye or other coloring agent. Hard or soft shell capsules may include, in addition to the active ingredient, a lubricant such as suggested immediately above, and also an inert filler such as lactose, sucrose, corn starch, or the like.

Solutions or syrups may include additional citric acid, or possibly another acid such as hydrochloric acid, lactic acid, succinic acid, maleic acid or the like, in order to bring pH to an appropriate range. Suspensions may include a surfactant such as polyoxyethylene sorbitan monooleate, which is an oxyethylated tertiary octylphenol formaldehyde polymer; and a suspending agent such as polyethylene glycol ether, carboxymethylcellulose, or methylcellulose. Solutions, syrups, or suspensions may include a buffer such as a phosphate, citrate, or tartrate buffer; a stabilizer such as disodium sequestrene, sodium sulfite, monothioglycerol, or the like; a preservative such as benzyl alcohol, parabens (methyl and propyl esters or p-hydroxbenzoic acid), etc.; sweetening agents; coloring agents; and/or flavorings.

Solutions may also include a viscosity control agent such as magnesium aluminum silicate, carboxymethylcellulose, or the like. Solutions and suspensions may be of the aqueous sugar or sorbital type. Parenteral solutions or suspensions may be made up including similar excipients.

The following are illustrative of typical formulations of pharmaceutical preparations:

Formulation 1.—Parenteral (250 milligrams per milliliter) solution

| | Percent w./v. |
|---|---|
| Diethylcarbamazine dihydrogen citrate | 25.00 |
| Methyl paraben | 0.08 |
| Propyl paraben | 0.02 |
| Distilled water, q.s. ad | 100.00 |

The ingredients are mixed in the distilled water and the preparation sterilized in the usual manner.

Formulation 2.—Parenteral (100 milligrams per milliliter) solution

| | Percent w./v. |
|---|---|
| Diethylcarbamazine dihydrogen citrate | 10.00 |
| Methyl paraben | 0.08 |
| Propyl paraben | 0.02 |
| Distilled water q.s. ad | 100.00 |

The ingredients are dissolved in the distilled water and sterilized.

Formulation 3.—Syrup

| | Percent w./v. |
|---|---|
| Diethylcarbamazine dihydrogen citrate | 4.00 |
| Sucrose | 5.00 |
| Methyl paraben | 0.08 |
| Propyl paraben | 0.02 |
| Flavor | 0.1 |
| FD and C Yellow No. 5 Dye | 0.002 |
| Distilled water, q.s. ad | 100.00 |

The ingredients are dissolved in the water.

Formulation 4.—Tablets

| | Per 100 tablets, g. |
|---|---|
| Diethylcarbamazine dihydrogen citrate | 15.0 |
| Corn starch | 2.7 |
| Lactose, spray dried | 35.7 |
| Magnesium stearate | 1.05 |
| | 54.45 |

The ingredients are mixed together and tableted to produce white tablets ½ inch.

Formulation 5.—Capsules

| | Per 1000 capsules, g. |
|---|---|
| Diethylcarbamazine citrate | 250.0 |
| Lactose USP, q.s. | 250.0 |
| Magnesium stearate | 1.0 |

The ingredients are mixed together and encapsulated.

Using 10 mg. per kilogram per day for 10 days on 15 human patients suffering from severe asthma, the following results were observed and are summarized in the table.

Intractable—those cases of asthma in which the usual bronchodilators (ephedrine, aminophylline, epinephrine) have little or no effect and in which relief could only be obtained through the use of corticoids.

While in the above table 10 mg. per kilogram per day was used, it has been found that after initial dose, smaller doses of 5 mg. per kilogram or less are sufficient for symptom-free maintenance.

I claim:

1. A method of treating asthma which comprises administering to a patient so affected an anti-asthmatically effective amount of a compound of the group consisting of N,N-diethyl-4-methyl-1-piperazinecarboxamide and non-toxic acid addition salts.

2. A method of treating asthma which comprises orally administering to an individual so affected from about 1 to about 15 milligrams per kilogram per day of a compound selected from the group consisting of N,N-diethyl-4-methyl-1-piperazinecarboxamide and its non-toxic acid addition salts.

3. A method of treating asthma which comprises orally administering to an individual so affected from about 2 to about 10 milligrams per kilogram per day of a compound selected from the group consisting of N,N-diethyl-4-methyl-1-piperazinecarboxamide and its non-toxic acid addition salts with a pharmaceutically acceptable carrier.

4. A method according to claim 2 wherein the drug is parenterally administered.

5. A method of relieving asthma in an individual so affected which comprises administering from about 2 to about 10 mg. per kilogram per day of N,N-diethyl-4-methyl-1-piperazinecarboxamide dihydrogen citrate with a pharmaceutically acceptable carrier.

TABLE.—DIETHYLCARBAMAZINE CITRATE TREATMENT OF INTRACTABLE ASTHMA

| Examples | Severity of asthma | Patient age | Time since onset | Previous treatments | Results |
|---|---|---|---|---|---|
| 1 | + | 6 | 3 yrs | Ephedrine aminophylline | Very good. |
| 2 | + | 10 | 5 yrs | do | Do. |
| 3 | ++ | 27 | 14 yrs | Cortisone glomectomy | Do. |
| 4 | + | 32 | 8 yrs | Ephedrine, aminophylline | Do. |
| 5 | ++ | 36 | 2 mos | Epinephrine, cortisone | Do. |
| 6 | + | 39 | 27 yrs | do | Do. |
| 7 | + | 39 | 12 yrs | do | Good (X). |
| 8 | ++ | 41 | 7 yrs | Cortisone glomectomy | Very good. |
| 9 | + | 42 | 6 yrs | Ephidrine, cortisone | Doubtful. |
| 10 | ++ | 43 | 5 yrs | do | Very good. |
| 11 | +++ | 47 | 31 yrs | Aminophylline, epinephrine cortisone (bleeding) | Good (X). |
| 12 | + | 47 | 8 yrs | Ephedrine aminophylline | Very good. |
| 13 | + | 61 | 13 yrs | Cortisone (8 years) | Very good (X). |
| 14 | + | 68 | 5 yrs | Ephedrine, cortisone | Very good. |
| 15 | + | 74 | 2 yrs | Cortisone (6 months) | Good. |

+ =Asthma severe; ++ =More severe; +++ =Most severe.
(X) Cortisone withdrawn after treatment with diethylcarbamazine dihydrogen citrate.

References Cited

UNITED STATES PATENTS 2,467,895  4/1949  Kushner.

ALBERT T. MEYERS, Primary Examiner

JEROME T. GOLDBERG, Assistant Examiner